(12) United States Patent
Soga et al.

(10) Patent No.: US 9,458,980 B2
(45) Date of Patent: Oct. 4, 2016

(54) IN-VEHICLE INTERIOR LIGHT UNIT

(71) Applicant: Kabushiki Kaisha T AN T, Saitama (JP)

(72) Inventors: Hisashi Soga, Saitama (JP); Yuji Shimoda, Saitama (JP); Hiroshi Ochiai, Saitama (JP)

(73) Assignee: KABUSHIKI KAISHA T AN T, Saitama (JP)

( * ) Notice: Subject to any disclaimer, the term of this patent is extended or adjusted under 35 U.S.C. 154(b) by 0 days.

(21) Appl. No.: 14/371,983

(22) PCT Filed: Jun. 14, 2013

(86) PCT No.: PCT/JP2013/066464
§ 371 (c)(1),
(2) Date: Jul. 11, 2014

(87) PCT Pub. No.: WO2014/034227
PCT Pub. Date: Mar. 6, 2014

(65) Prior Publication Data
US 2014/0376250 A1 Dec. 25, 2014

(30) Foreign Application Priority Data

Aug. 29, 2012 (JP) ................................. 2012-188257

(51) Int. Cl.
*F21S 8/10* (2006.01)
*B60Q 3/02* (2006.01)
*F21Y 101/00* (2016.01)

(52) U.S. Cl.
CPC ............... *F21S 48/31* (2013.01); *B60Q 3/02* (2013.01); *B60Q 3/0279* (2013.01); *B60Q 3/0293* (2013.01); *F21Y 2101/00* (2013.01)

(58) Field of Classification Search
CPC ...... F21S 48/31; F21Y 2101/00; B60Q 3/02; B60Q 3/0293; B60Q 3/0279
See application file for complete search history.

(56) References Cited

U.S. PATENT DOCUMENTS

2007/0025115 A1* 2/2007 Ochiai ................. B60Q 3/0203
362/488

FOREIGN PATENT DOCUMENTS

| JP | 55-156388 U | 11/1980 |
|---|---|---|
| JP | 53-125680 U | 8/1988 |
| JP | 2009-173163 A | 8/2009 |
| JP | 2012-129006 A | 7/2012 |

OTHER PUBLICATIONS

Translation of claims and detailed description of drawings of JP55-156388 U dated Nov. 11, 1980.
(Continued)

*Primary Examiner* — Anne Hines
(74) *Attorney, Agent, or Firm* — Hedman & Costigan, P.C.; James V. Costigan; Kathleen A. Costigan

(57) ABSTRACT

This invention is to provide an in-vehicle interior light unit that protects a base from a thermal damage attributable to a thermal factor and reduces cost. This is achieved by adopting a general-purpose compact bulb cassette which does not have a heat shielding function although the bulb cassette still uses a heat-resistant resin as the material thereof, and the thermal deformation due to the radiant heat from a bulb is prevented by a heat shield plate integrally formed when punch-molding a bus bar, which is formed of a conductive metal member. Thus, the radiant heat from the bulb is blocked by the heat shield plate.
An in-vehicle interior light unit in accordance with the present invention includes: a housing-shaped base formed of a non-heat-resistant thermoplastic resin; a bus bar integrally formed with a heat shielding plate which is mounted in the base and which rises in the vicinity of a general-purpose bulb; a bulb holder electrically connected to the bus bar; a general-purpose vertical type bulb cassette which is provided with the bulb holder and which has a socket function; a general-purpose bulb which is vertically mounted in the bulb cassette and which is electrically connected to the bulb holder; and a lens mounted on a front surface of the base.

2 Claims, 7 Drawing Sheets

(56) References Cited

OTHER PUBLICATIONS

Translation of claims and detailed description of drawings of JP63-125680 U dated Aug. 16, 1988.

English Abstract of JP 2012-129006A dated Jul. 5, 2012.
English Abstract of JP 2009-173163A dated Aug. 6, 2009.
International Search Report from counterpart application PCT/JP2013/066464 dated Aug. 6, 2013.

* cited by examiner

IN-VEHICLE INTERIOR LIGHT UNIT

BACKGROUND OF THE INVENTION

1. Field of the Invention

The present invention relates to an in-vehicle interior light unit that does not provide heat shield plates, which block the radiant heat emitted from bulbs mounted in bulb cassettes of the in-vehicle interior light unit, directly on the bulb cassettes; that has compact general-purpose bulb cassettes instead of exclusive bulb cassettes; that achieves significantly reduced cost overall by integrally forming the heat shield plates, which block the radiant heat from the bulbs, when pressing a conductive bus bar; and that allows the function of the heat shield plates to be accomplished at low cost.

2. Background Art

As illustrated in FIG. 7, a conventional in-vehicle interior light unit is constituted of a base 50, which is a non-heat-resistant resin housing, a bus bar 10 formed of a metal member, which is a conductive member, and mounted on the base 50, heat-resistant resin bulb cassettes 30 to be mounted respectively at right and left of the bus bar 10, and horizontal mount type lighting boat-shaped bulbs 40 to be mounted in the bulb cassettes 30. FIG. 7 is an exploded perspective view of the conventional in-vehicle interior light unit from which the base 50 has been removed. The bus bar 10 is formed by punching an electrically conductive metal material. The bulb cassettes 30 are formed of a heat-resistant resin. Heat shield plates 20 having a heat shielding function are formed integrally with the bulb cassettes 30 made of a heat-resistant resin, the heat shield plates 20 being formed by using the same heat-resistant resin as that of the bulb cassettes 30. The heat-resistant resin bulb cassettes 30 to be respectively mounted at right and left of the bus bar 10 are set at the right and left positions within the extension of the bus bar 10 such that the heat shield plates 20 at right and left oppose each other. The boat-shaped bulbs 40, which are used in a horizontally rested state, are mounted in the right and left bulb cassettes 30 placed on the base 50.

The radiant heat emitted as illumination light from the boat-shaped bulbs 40 is blocked by the heat shield plates 20, which are horizontally long and which are made of a heat-resistant resin.

However, the aforesaid conventional bulb cassettes 30 made of a heat-resistant resin use the boat-shaped bulbs 40 adapted to be horizontally mounted, thus requiring a horizontally large area and space overall. Further, the conventional bulb cassettes 30 have been posing drawbacks in that the bulb cassettes 30 themselves must be formed of a heat-resistant resin, which inevitably requires high material cost and time for molding, and the bulb cassettes 30 themselves require a horizontally large installation space, meaning that the area for installation on the conventional base 50 is undesirably large. In addition, the bulb cassettes 30 have been handled as exclusive components, disadvantageously lacking in versatility.

As a heat shielding structure of a conventional in-vehicle interior light, an invention has been disclosed in which a heat shielding structure includes a base formed of a resin material having low heat resistance, such as polypropylene, and a wall surface located adjacently to the bulb incorporated in the base, a bulb cassette for installing the bulb in the base is formed of a heat-resistant resin, and a heat shield wall interposed between the bulb and the wall surface is connected to the bulb cassette (refer to Patent Document 1).

[Patent Document 1] Japanese Patent Application Laid-Open No. 2007-30767

SUMMARY OF THE INVENTION

According to the invention disclosed in Patent Document 1 described above, the bulb cassette for mounting the bulb in the base is formed of a heat-resistant resin, and the heat shield wall interposed between the bulb and the wall surface is connected to the bulb cassette. This makes it possible to prevent the thermal deformation of the wall surface that provides a space in the base for accommodating the bulb, thereby preventing the value of the product from deteriorating and also preventing other components from being affected.

Forming the heat shield walls on both sides so as to sandwich the bulb makes it possible to prevent the thermal deformation of two wall surfaces. In addition, forming the heat shield walls integrally with the bulb cassette provides advantages, including reduced cost, as compared with a case where separate components are attached to the bulb cassette.

The conventional structure according to the invention described above indicates an improvement in that the bulb cassette for mounting the bulb in the base is formed of a heat-resistant resin and another improvement in that the heat shield wall interposed between the bulb and the wall surface is connected to the bulb cassette, thereby preventing the wall surface of the base from being thermally deformed by the bulb. Further, the structure according to the aforesaid invention permits a reduction in cost by forming the heat shield walls on both sides integrally with the bulb cassette, sandwiching the bulb. The structure, however, inevitably involves high material cost because of the use of a heat-resistant resin, which is a costly material, to form a portion that includes the heat shield walls.

An object of the present invention is to provide an in-vehicle interior light unit that protects a base from a thermal damage attributable to a thermal factor and reduces cost. This is achieved by adopting a general-purpose compact bulb cassette which does not have a heat shielding function although the bulb cassette still uses a heat-resistant resin as the material thereof, and the thermal deformation due to the radiant heat from a bulb is prevented by a heat shield plate integrally formed when punch-molding a bus bar, which is formed of a conductive metal member. Thus, the radiant heat from the bulb is blocked by the heat shield plate.

An in-vehicle interior light unit in accordance with the present invention includes: a housing-shaped base, which is formed of a non-heat-resistant thermoplastic resin and which has an internal space thereof divided by right and left partition plates integrally molded with the thermoplastic resin; general-purpose bulbs installed in a vertical direction in the vicinity of the respective partition plates of right and left spaces in the base; heat shield plates vertically provided between the right and left bulbs and the right and left partition plates; and lenses attached such that the lenses cover an opening of the base, wherein the heat shield plates are formed by punching a widthwise-remaining portion of a belt-shaped conductive metal hoop material such that the heat shield plates are connected to the ends of an innermost bus bar, one at each end, among a plurality of bus bars, which are formed by punching one side in a lengthwise direction of the metal hoop material and which extend to reach the right and left spaces on one side of the width of a bottom in the base, and that the heat shield plates are vertically provided in the width direction of the housing shape such that the heat shield plates are orthogonal to the bus bars, the bus bars formed by punching integrally with the heat shield plates are electrically connected to bulb holders, general-purpose vertical type bulb cassettes, which accommodate the bulb holders and have a socket function, are installed in the vertical direction, and the general-purpose bulbs are electrically connected to the bulb holders.

In the in-vehicle interior light unit in accordance with the present invention, the heat shield plates respectively connected to the bus bars in the vicinity of the bulbs placed in the right and left spaces in the base are provided vertically with respect to the bars in the invention according to claim 1.

In the in-vehicle interior light unit in accordance with the present invention, the general-purpose vertical type bulb cassette is constructed to have a bulb insertion portion and a bulb holder for electrical connection to the bus bar and to have no heat shield plate for blocking radiant heat from the bulb in the invention according to claim 1 or 2.

The in-vehicle interior light unit in accordance with the present invention uses a heat-resistant resin as the material for the bulb cassette, whereas the bulb cassette is not integrally formed with the heat shield plates. This requires a reduced amount of a resin material used and shortens resin molding time, thus permitting a reduction in cost.

The conventional bulb cassette is formed to be horizontally long so as to house the boat-shaped bulb and also provided with the heat shield plates for blocking the radiant heat from the bulb. This requires that the whole bulb cassette be formed of a heat-resistant resin and that a large installation space be secured because of the horizontally long shape thereof, resulting in high material cost and extended machining time. According to the present invention, the compact bulb cassette for housing a general-purpose wedge bulb is used, and the bulb cassette does not have heat shield plates, thus permitting reduced cost of the bulb cassette and a reduced area for installing the bulb cassette.

According to the present invention, the thermal deformation of the base due to the radiant heat from a bulb can be prevented by the heat shield plates integrally formed at the time of punch-molding the bus bar made of a conductive metal member. More specifically, a conventional bus bar is obtained by punching a belt-shaped conductive metal hoop material by using a press die. According to the present invention, a portion of the conventional hoop material, which has been treated as a waste material in conventional punching, is effectively used as the heat shield plates. Therefore, the same hoop material as the conventional one is used, while the portion thereof that used to be a waste is effectively used as the heat shield plates. This has led to no increase in cost of a hoop material. In addition, the heat shield plates are formed integrally with the bus bar, which is a pressed part, so that the machining time remains the same with no increase in cost.

Further, when assembling the components that constitute the in-vehicle interior light unit, the heat shield plates are punched integrally with the bus bar, resulting in no additional assembly step, as compared with a conventional assembly process. The heat shield plates punched integrally with the bus bar block the radiant heat from the bulb, thus protecting the base from damage caused by thermal factors.

DESCRIPTION OF THE PREFERRED EMBODIMENTS

The following will describe the present invention in detail with reference to the accompanying drawings.

Figure 1:
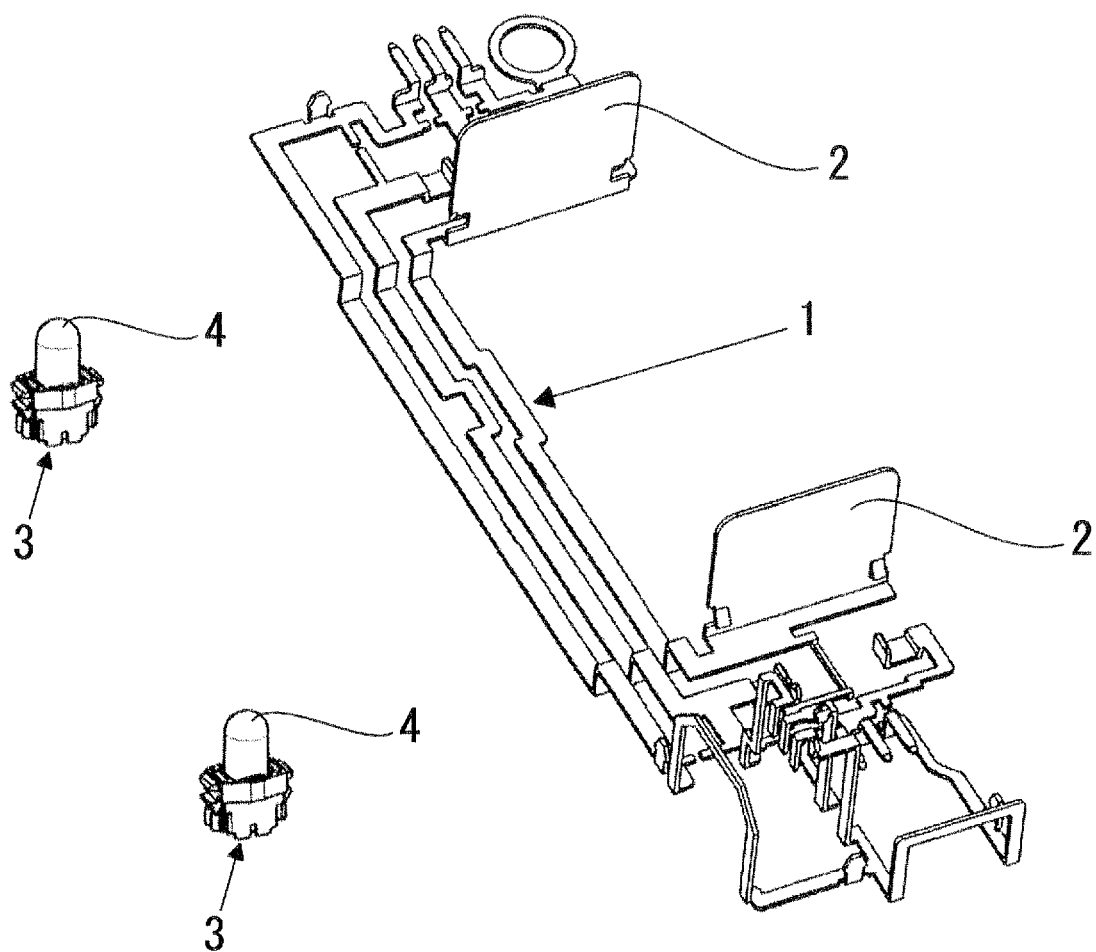
FIG. 1 is an exploded perspective view illustrating an embodiment of the present invention.

FIG. 1 is an exploded perspective view illustrating an embodiment of the present invention.

Reference numeral 1 denotes a bus bar. The bus bar 1 is obtained by continuously punching a belt-shaped conductive metal hoop material by a press die. At the time of the punching, heat shield plates 2 are punched to be formed integrally with the bus bar 1. Conventionally, a portion of the metal hoop material that corresponds to the heat shield plates 2 has been discarded as a waste. In the present embodiment, the portion that has conventionally been discarded as a waste is effectively utilized. Further, the heat shield plates 2 in the present embodiment are formed in the vicinity of general-purpose bulbs 4 mounted in general-purpose bulb cassettes 3. The radiant heat from the general-purpose bulbs 4 is blocked by the metal heat shield plates 2, thereby preventing the thermal damage to a base 5 formed of a thermoplastic resin. In the present embodiment, two rectangular heat shield plates 2 are installed at right and left such that the heat shield plates 2 face each other with a predetermined interval provided therebetween. The number of the heat shield plates 2 to be installed may be determined according to the number of the bulbs 4. The bus bar 1 is a wiring component formed by cutting a conductive belt-shaped metal hoop material into a narrow strip by using a press die and by continuous forming by pressing.

Unlike the conventional boat-shaped bulbs 40, which are horizontally mounted, the general-purpose bulbs 4 are vertically mounted, thus requiring a smaller installation space. The general-purpose bulb cassettes 3 have a socket function for vertically mounting the general-purpose bulbs 4, and obviate the need for providing the horizontally long heat shield plates 20 made of a heat-resistant resin around the general-purpose bulb cassettes 3 as in the conventional art, so that the bulb cassettes 3 are simplified moldings which are formed of a heat-resistant resin and which are space-saving as a whole.

Figure 2:
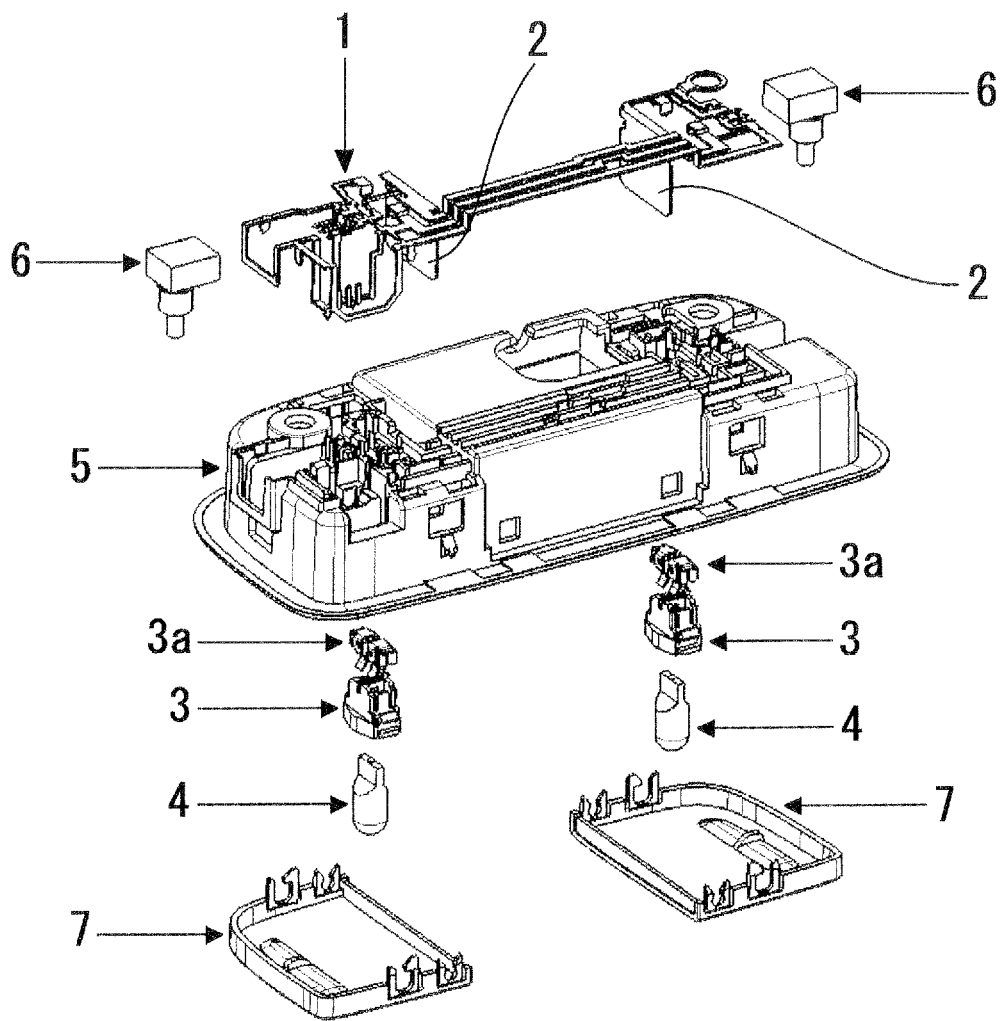
FIG. 2 is an assembly exploded perspective view illustrating the embodiment of the present invention.

FIG. 2 is an assembly exploded perspective view illustrating the embodiment of the present invention.

The in-vehicle interior light unit is attached to the roof lining of a vehicle to mainly illuminate rear seats, a driver's seat or a front passenger seat. The in-vehicle interior light unit is turned on/off by turning switch buttons 6.

Figure 3:
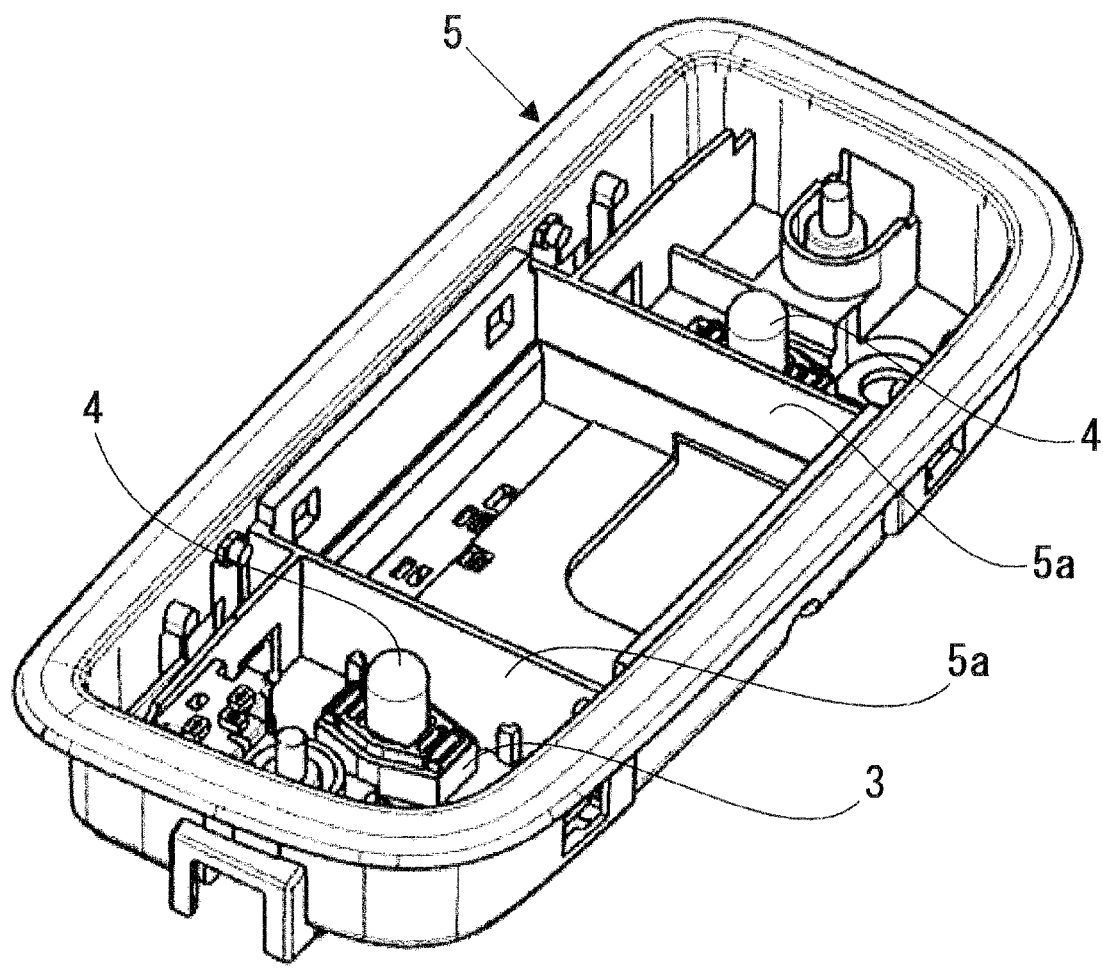
FIG. 3 is a perspective view illustrating the embodiment of the present invention before inserting a bus bar.

The base 5 is formed of a thermoplastic resin into a substantially rectangular container or housing shape as a whole, and has three spaces defined by partition plates 5a and 5a (refer to FIG. 3). The general-purpose bulbs 4 are placed in the base 5 by being respectively mounted in the general-purpose bulb cassettes 3, to which bulb holders 3a are attached, and installed in the right and left spaces in the base 5, excluding the middle space. Thus, the general-purpose bulbs 4 are electrically connected to the bus bar 1 through the bulb holders 3a. The heat shield plates 2 are installed between the right and left partition plates 5a and 5a of the base 5 and the general-purpose bulbs 4 and 4 mounted in the right and left spaces such that the heat shield plates 2 are positioned more closely to the partition plates 5a and 5a. The heat shield plates 2, which are connected to the bus bar 1, are simultaneously installed when the bus bar 1 is installed in the base 5. Lens assemblies 7 cover the right and left spaces of the base 5.

Figure 4:
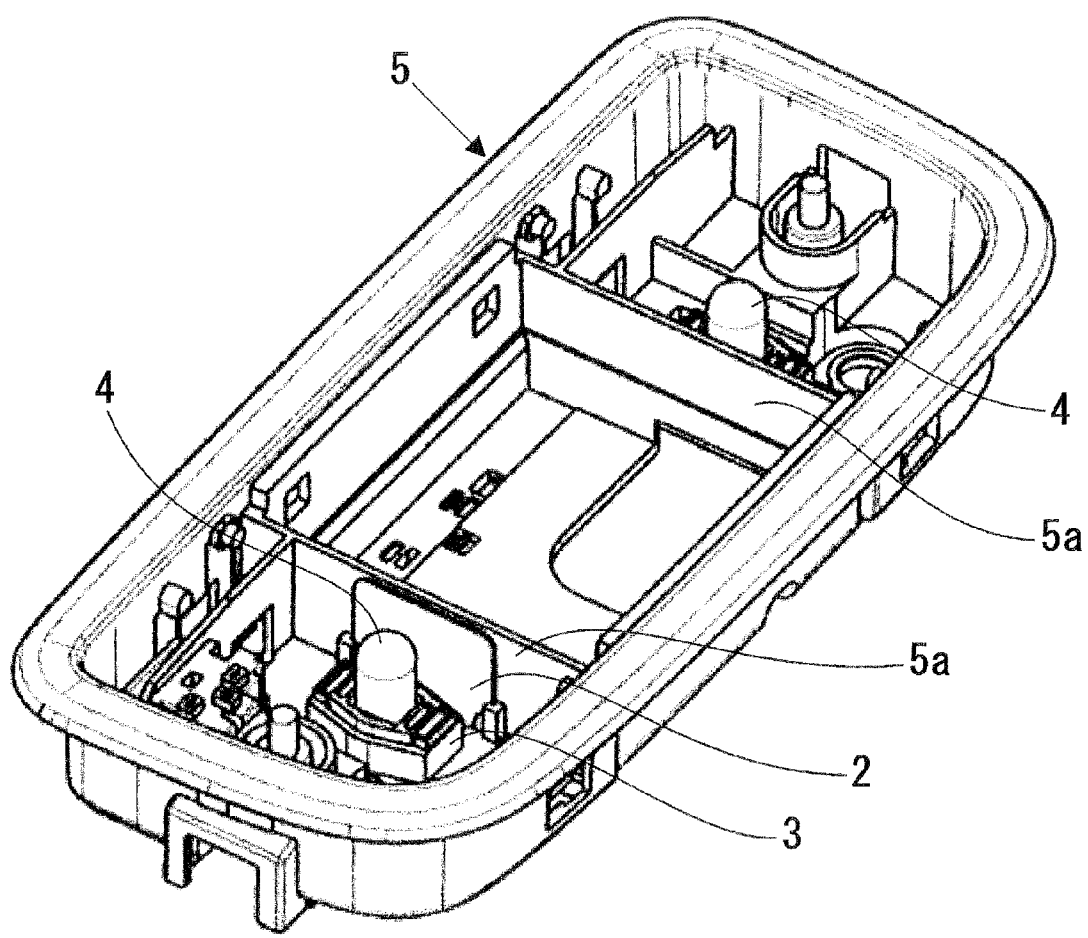
FIG. 4 is a perspective view illustrating the embodiment of the present invention after inserting the bus bar.

FIG. 3 is a perspective view illustrating the embodiment of the present invention before the bus bar is inserted. FIG. 4 is a perspective view illustrating the embodiment of the present invention after the bus bar has been inserted.

FIG. 3 illustrates a case where the heat shield plate 2 is not provided between the general-purpose bulb 4 and the partition plate 5a formed on the base 5 by using the same resin material. FIG. 4 illustrates a case where the heat shield plate 2 is installed between the general-purpose bulb 4 and the partition plate 5a formed on the base 5 by using the same resin material. By installing the heat shield plates 2, the radiant heat from the general-purpose bulbs 4 is blocked by the heat shield plates 2 so as to protect the partition plates 5a and 5a from thermal damage.

Figure 5:
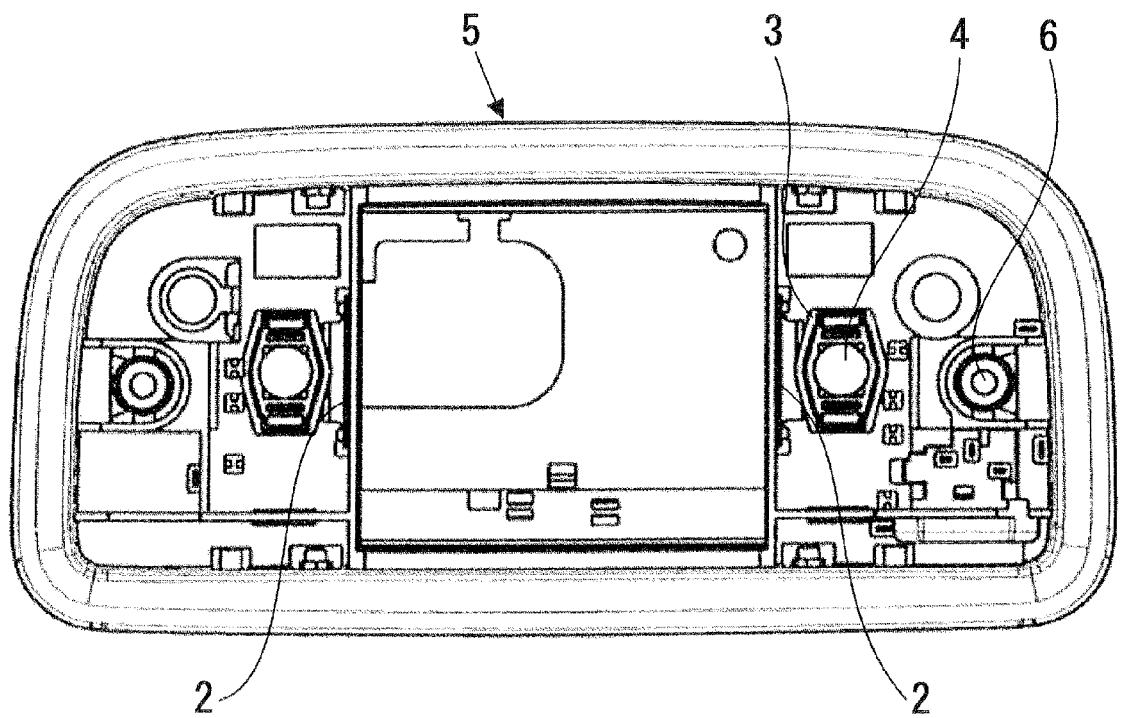
FIG. 5 is an external view illustrating the embodiment of the present invention after the unit has been completed without installing lens assemblies.
Figure 6:
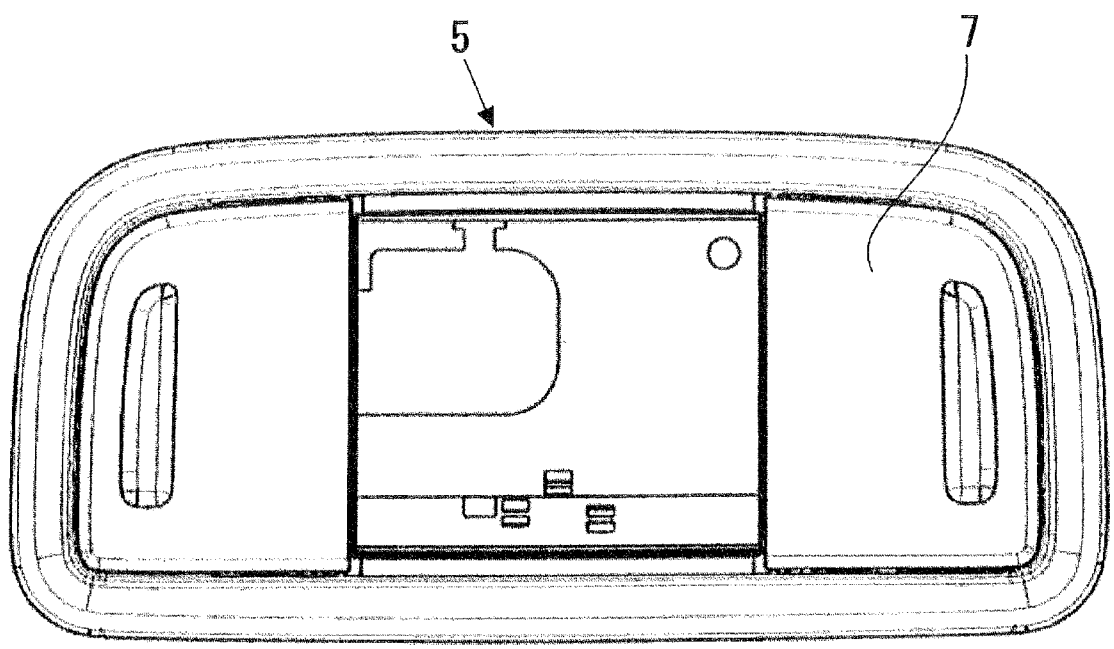
FIG. 6 is an external view illustrating the embodiment of the present invention after the unit has been completed with the lens assemblies installed.
Figure 7:
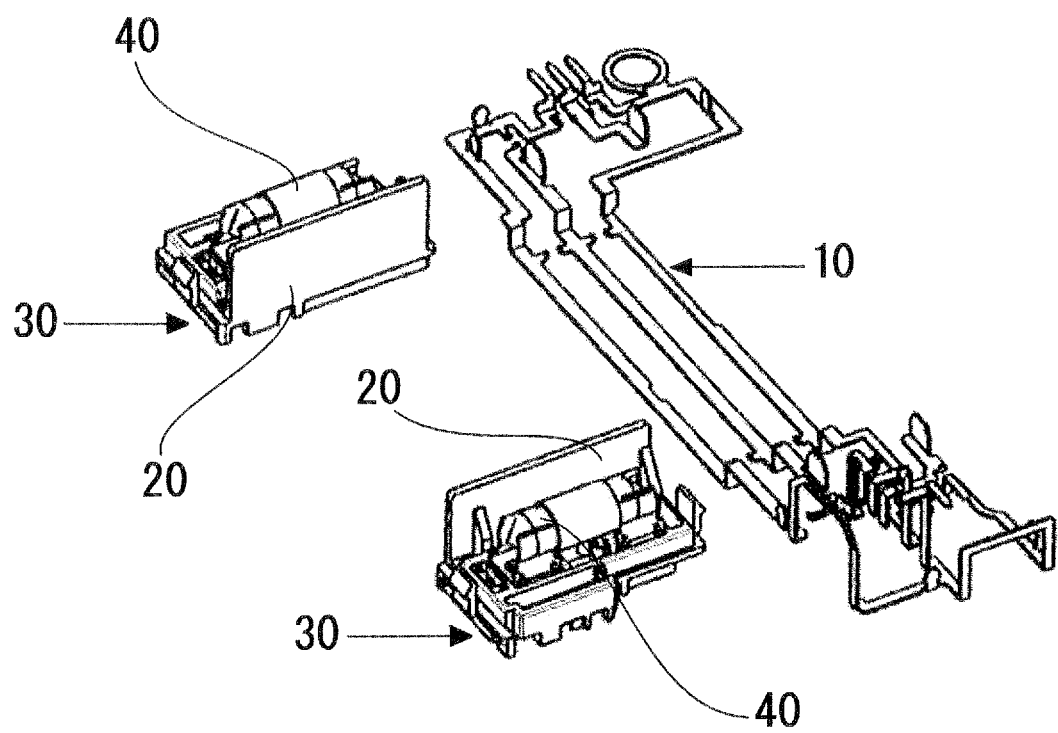
FIG. 7 is a perspective view illustrating the relationship between a bus bar and a bulb cassette of a conventional example.

FIG. 5 is an external view illustrating the embodiment of the present invention after the unit has been completed without installing the lens assemblies 7. FIG. 6 is an external view illustrating the embodiment of the present invention after the unit has been completed with the lens assemblies 7 installed.

Referring to FIG. 5, each of the heat shield plates 2 is provided adjacently to each of the partition plates 5a. Further, the heat received by the heat shield plates 2 is efficiently diffused to the outside through the large surface area of the bus bar 1 formed of a metal material having high thermal conductivity. The light of the general-purpose bulbs 4 is dispersed substantially evenly by the surfaces of the lens assemblies 7, causing the luminous flux to be radiated in a desired direction in the vehicle.

The in-vehicle interior light unit in accordance with the present invention has the bulb cassettes that do not have a structure for blocking the radiant heat of bulbs and are shaped not to produce wasteful portions, thus making it possible to reduce the amount of a material and the molding time, permit use as general-purpose components for other products, contribute to increasing the quantity used, and improve molding efficiency with resultant reduced cost. Further, when the bus bar is formed, the heat shield plates are formed by using a portion that used to be discarded as a waste, so that the quantity of hoop materials used remains unchanged and the time required for machining the pressed components also remains unchanged, leading to no increase in cost. In addition, the heat shield plates are formed integrally with the bus bar in the assembly of the in-vehicle interior light unit. This provides advantages, including no additional step in the manufacturing process, thus benefiting in-car component manufacturers, consumers and the like.

DESCRIPTION OF REFERENCE NUMERALS 1 bus bar
2 heat shield plate
3 general-purpose bulb cassette
3a bulb holder
4 general-purpose bulb
5 base
6 switch button
7 lens assembly

The invention claimed is:

1. An in vehicle interior light unit, comprising:
a housing-shaped base having an elongated length and a width that is less than said elongated length, said housing-shaped base being formed of a non-heat-resistant thermoplastic resin and said housing-shaped base having an internal space that is divided by right and left resin partition plates integrally molded within said housing-shaped base to form right and left spaces in said housing-shaped base;
light bulbs installed in a vertical direction in light bulb cassettes that are respectively positioned adjacent said right and left resin partition plates within right and left spaces in said housing-shaped base;
right and left heat shield plates vertically provided between said light bulbs and said right and left resin partition plates;
lenses attached such that said lenses cover an opening of said housing-shaped base;
wherein said heat shield plates are vertically arranged in the direction of said width of said housing-shaped base so that said heat shield plates arc orthogonal to a plurality of elongated bus bars arranged along said elongated length of said housing-shaped base wherein one of said plurality of bus bars has a first and a second end where a heat shield is integrally formed at each of said first end and said second end of said bus bar; and
wherein said light bulbs are electrically connected to a bus bar through said light bulb cassette.

2. The in-vehicle interior light unit according to claim 1, wherein said bulb cassettes are constructed to have bulb insertion portions and bulb holders for electrical connection to the bus bars without a heat shield plate for blocking radiant heat from said bulbs.

* * * * *